United States Patent [19]

Nakano et al.

[11] Patent Number: 4,878,746
[45] Date of Patent: Nov. 7, 1989

[54] SURGICAL MICROSCOPE APPARATUS

[75] Inventors: Hiroshi Nakano; Toyoaki Takeuchi, both of Ina; Toshiyuki Tsunoda, Sagamihara; Masahiko Kinukawa, Tokyo, all of Japan

[73] Assignee: Olympus Optical Co., Ltd., Tokyo, Japan

[21] Appl. No.: 178,967

[22] Filed: Apr. 7, 1988

[30] Foreign Application Priority Data

Apr. 9, 1987 [JP] Japan .................................. 62-87421
Oct. 12, 1987 [JP] Japan ............................... 62-256518

[51] Int. Cl.$^4$ ............................................. G02B 21/00
[52] U.S. Cl. ................................... 350/507; 340/641; 340/642
[58] Field of Search ................ 350/507; 340/635, 641, 340/642

[56] References Cited

U.S. PATENT DOCUMENTS 3,987,463  10/1976  Nishikawa et al. ................. 350/513

Primary Examiner—Bruce Y. Arnold
Assistant Examiner—J. P. Ryan
Attorney, Agent, or Firm—Cushman, Darby & Cushman

[57] ABSTRACT

A surgical microscope apparatus provided with a failure detecting device for conducting an initial examination and an ordinary examination of an illumination device and a failure detecting device for conducting the ordinary examination of an electric magnification and focusing device, in order to make it possible to self-examine what is defective and indicate the result when failure is caused. The failure of the illumination device is immediately indicated by the self examination of the failure detecting device when a power source is turned on for use.

10 Claims, 12 Drawing Sheets

FIG. 4

| MONITORING SECTION | | | | | | | | | | MONITORING STANDARD |
|---|---|---|---|---|---|---|---|---|---|---|
| POWER SOURCE VOLTAGE | 1 | 1 | 1 | 1 | 1 | 1 | 1 | 1 | 0 | 1 --- NORMAL<br>0 --- ABNORMAL |
| INPUT FROM FOOT-SWITCH | 0 | 1 | 0 | 1 | 0 | 1 | 0 | 1 | X | 1 --- YES<br>0 --- NO |
| VOLTAGE SUPPLIED TO MOTOR | 0 | 1 | 1 | 0 | 0 | 1 | 1 | 0 | X | 1 --- NORMAL<br>0 --- ABNORMAL |
| CURRENT SUPPLIED TO MOTOR | 0 | 1 | 1 | 0 | 1 | 0 | 0 | 1 | X | 1 --- YES<br>0 --- NO |
| RESULTANT OUTPUT OF EXAMINATION | A | B | C | D | E | F | G | H | I | |

FIG. 5

| MONITORING SECTION | | | | | | MONITORING STANDARD |
|---|---|---|---|---|---|---|
| POWER SOURCE VOLTAGE | 1 | 1 | 1 | 1 | 0 | 1 --- NORMAL<br>0 --- ABNORMAL |
| VOLTAGE SUPPLIED TO ILLUMINATING LAMP | 1 | 0 | 1 | 0 | X | 1 --- NORMAL<br>0 --- ABNORMAL |
| CURRENT SUPPLIED TO ILLUMINATING LAMP | 1 | 1 | 0 | 0 | X | 1 --- YES<br>0 --- NO |
| RESULTANT OUTPUT OF EXAMINATION | a | b | c | d | e | |

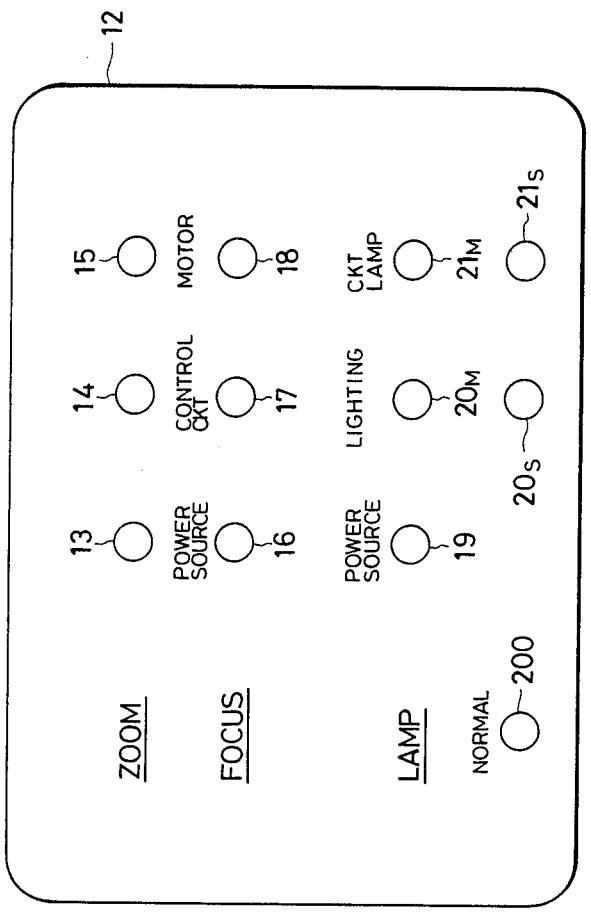

SURGICAL MICROSCOPE APPARATUS

BACKGROUND OF THE INVENTION (a) Field of the invention

The present invention relates to a surgical microscope apparatus, and more particularly to an apparatus for maintenance of a surgical microscope.

(b) Description of the prior art

In medical apparatus such as surgical microscopes, reliability and maintenance are of importance in view of their functions. That is, it is required that the apparatus of the type cause virtually no failure and, in case there should be any failure, they are easy in repair and can return to an original state within a short time.

FIG. 1 shows an example of known surgical microscope apparatus. In this figure, reference symbol B represents a stand for electrical equipment, P a post inserted upright into the stand B for electrical equipment, L a lamp house provided at the top of the pole P, A an arm attached to the pole P, M a lens unit body of a stereomicroscope mounted at a free end of the arm A through an electric focusing device F, G a light guide for introducing illumination light from the lamp house into an illuminating optical system, not shown, incorporated in the lens unit body, and S a foot switch for operating an electric magnification device V housed in the electric focusing device F and the lens unit body M through control circuits, not shown, incorporated in the stand B for electrical equipment. The magnification device V and the focusing device F are driven by stepping operation on the foot switch and an affected part to be operated is illuminated by an illumination device during the surgical operation.

Now, assuming that the electric magnification device V or the electric focusing device F is not actuated by the stepping of the foot switch, this trouble is attributable, as electrical causes, to one or more of (i) the failure of the foot switch S, (ii) the failure of an electric magnification control circuit or an electric focusing control circuit housed in the stand B for electrical equipment and (iii) the failure of the electric magnification device V or the electric focusing device F.

In conventional surgical microscopes, however, it has been required that by receiving a communication from a user for the failure of the microscope apparatus as an example, a service man checks, in the field, each of the foot switch S, the stand B for electrical equipment and the electric magnification device V or the electric focusing device F, in order to troubleshoot the apparatus with respect to the above causes of failure, confirms the failure and then prepares parts necessary for repair, before starting to repair the apparatus. As such, where the failure of the apparatus is once caused and must be eliminated rapidly, various difficulties have been encountered that not only sometimes such demand cannot properly be met, but also a fatal accident may be brought about due to insufficient maintenance, though the repair has been effected.

SUMMARY OF THE INVENTION

In view of the above circumstances, a primary object of the present invention is to provide a surgical microscope apparatus which can self-examine and indicate what is defective whenever failure occurs.

Another object of the present invention is to provide a surgical microscope apparatus which can previously self-examine and indicate the failure of an illumination device which may occur when a power source is turned on for use.

These objects are accomplished, according to the present invention, by providing the illumination device with a failure detecting device for performing initial and ordinary examinations and by providing an electric magnification and focusing device with failure detecting devices for performing the ordinary examination. Thus, when the power source is turned on, the initial examination is started simultaneously, and if the illumination device develops trouble, the area and state of the failure are indicated by the failure detecting device so that the detection of the failure and the repair can be effected before a surgical operation is started. Then after the initial examination is completed, the ordinary examinations of the illumination device and the magnification and focusing devices are conducted and the state of the failure is indicated together with the area of the failure if any trouble, so that the detection of the failure and the repair can be carried out.

According to a preferred formation of the present invention, the failure detecting device comprises an operation state monitoring circuit monitoring an electrical operation state of the apparatus, a self-examining circuit determining whether or not the operation state is normal in accordance with an output signal issued from the operation state monitoring circuit, and an indicating circuit indicating output issued from the self-examining circuit, in which the operation state monitoring circuit is electrically insulated from the self-examining circuit.

According to another preferred formation of the present invention, the initial examination is started from the supply of the power, the detection of cover closure of a lamp house effected by a cover opening and closing sensor, and the detection of a preset temperature in the lamp house effected by a temperature sensor so that the ordinary examination is started after the initial examination is completed.

According to the surgical microscope apparatus of the present invention, reliability and maintenance can be far more improved as compared with the conventional surgical microscope apparatus and also safety for a patient can be improved in the surgical operation performed under the microscope.

These and other objects as well as the features and the advantages of the present invention will become more apparent from the following detailed description of the preferred embodiments when taken in conjunction with the accompanying drawings.

BRIEF DESCRIPTION OF THE DRAWINGS

FIG. 4 is a table showing an example of the contents of logic operation of a self-examining circuit for the electric magnification (or focusing) device;

FIG. 5 is a table showing an example of the contents of logic operation of a self-examining circuit for the illumination device;

FIG. 6 is a view showing an example of an indication panel;

DESCRIPTION OF THE PREFERRED EMBODIMENTS

Figure 1:
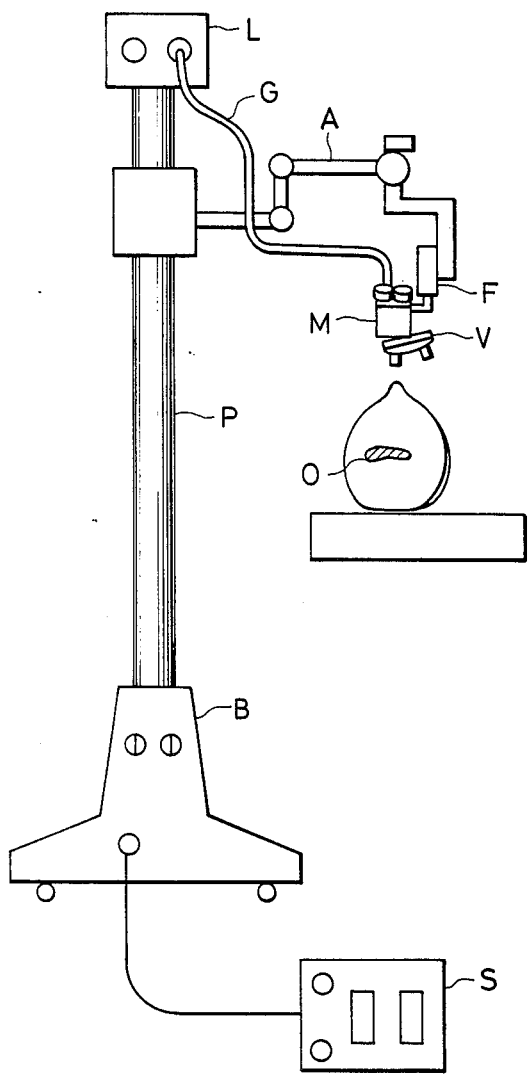
FIG. 1 is a schematic view showing the entire structure of a conventional surgical microscope apparatus.

Referring to embodiments shown in the drawings, the present invention will be specifically described in the following.

Figure 2:
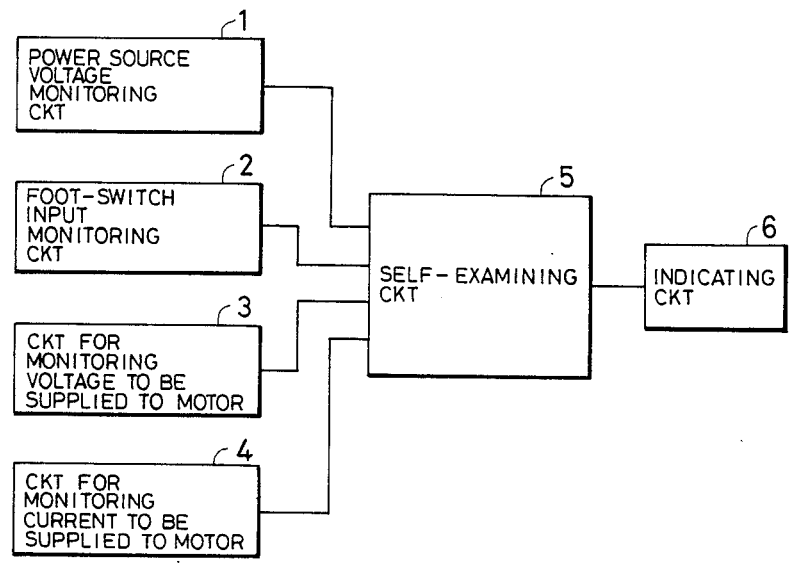
FIG. 2 is a block diagram showing an example of a failure detecting device for a electric magnification device and an electric focusing device according to the present invention.
Figure 3:
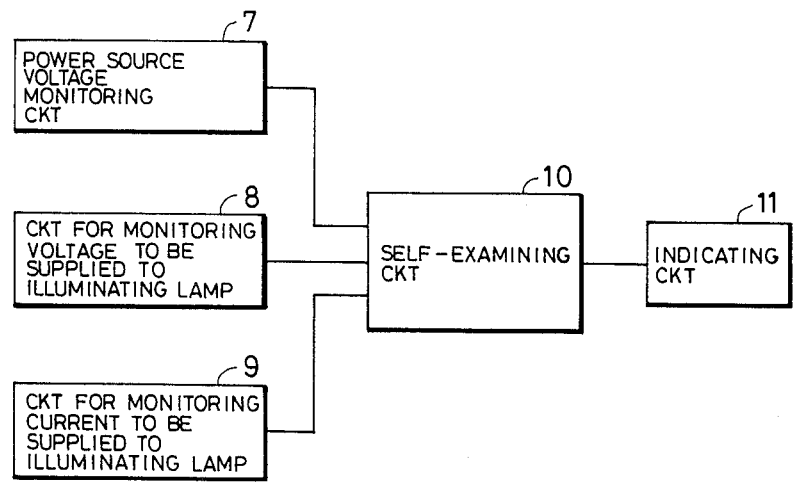
FIG. 3 is a block diagram showing an example of a failure detecting device for an illumination device according to the present invention.

FIG. 2 shows an example of the formation of a failure detecting device relative to an electric magnification device and an electric focusing device and FIG. 3 shows an example of the formation of the failure detecting device relative to an illumination device. In FIG. 2 at first, reference numeral 1 represents a power source voltage monitoring circuit outputting the signal of "NORMAL" when a power source switch, not shown, is turned on and the magnitude of voltage supplied to an electric magnification control circuit is within a certain preset range, and "ABNORMAL" when it is outside that range, 2 a switch input monitoring circuit outputting "NORMAL" when a foot switch S is operated and voltage of the magnitude within a certain preset range is supplied, and "ABNORMAL" in other magnitudes, 3 a circuit for monitoring voltage to be supplied to motor which outputs "NORMAL" when the foot switch S is operated and the magnitude of voltage applied across the terminals of a driving motor for magnification is within a certain preset range, and "ABNORMAL" when it is outside that range, 4 a circuit for monitoring current to be supplied to motor which outputs "NORMAL" when the foot switch is operated and the amount of current flowing through a driving motor for magnification is within a certain preset range, and "ABNORMAL" when it is outside that range, and 5 a self-examining circuit for the electric magnification device which performs logic operation, as described later, in accordance with input data obtained from each of monitoring circuits 1, 2, 3 and 4 to output the results to an indicating circuit 6. As described above, the failure detecting device for the electric magnification device has been explained. The failure detecting device for the electric focusing device is also formed in the same manner as the above and therefore the explanation of its formation is omitted. Next, in FIG. 3, reference numeral 7 represents a power source voltage monitoring circuit outputting "NORMAL" when the power source is switched on and the magnitude of voltage supplied to a lightening circuit of an illuminating lamp is within a certain preset range, and "ABNORMAL" when it is outside that range, 8 a circuit for monitoring voltage to be supplied to illuminating lamp which outputs "NOR- MAL" when the magnitude of voltage applied across the terminals of the illuminating lamp is within a certain preset range, and "ABNORMAL" when it is outside that range, 9 a circuit for monitoring current to be supplied to illuminating lamp which outputs "NORMAL" when the amount of current flowing through the illuminating light is within a certain preset range, and "ABNORMAL" when it is outside that range, and 10 a self-examining circuit for the illumination device which perform logic operation, as described later, in accordance with input transmitted from each of monitoring circuits 7, 8 and 9 to output the results to an indicating circuit 11. The outputs of "NORMAL" and "ABNORMAL" in each circuit described above may be "High" and "Low" of the output level in a logic circuit and otherwise may be "ON" and "OFF" of an LED in a photocoupler, respectively. However, the explanation for the examples of these circuits, which are known, is omitted. Also, the self-examining circuits 5, 10 mentioned above may be either a hard logic or a CPU circuit with soft control and, in addition, the indicating circuits 6, 11 may be 7-segment LEDs or ordinary round LEDs.

FIG. 4 shows an example of the contents of logic operation in the self-examining circuit 5 for the electric magnification (or focusing) device and FIG. 5 shows an example of the contents of logic operation in the self-examining circuit 10 of the illumination device. That is, in FIG. 4, it is indicated that the device is normal in a resultant output of examination represented by reference symbol A or B, the motor control circuit is abnormal in C, D or E, the wiring of the motor burns out in F, the motor control circuit is abnormal in G, the motor is in short-circuit in H, and the power source circuit is abnormal in I. In FIG. 5, on the other hand, a resultant output of examination represented by reference symbol a indicates that the device is normal, b that the output shorts, c that the lamp burns out, d that the lightening circuit of the illuminating lamp fails, and e that the power source circuit is in trouble. The indicating circuits 6, 11 indicate the failures in accordance with the resultant output of examination as described above and, in connection with this, FIG. 6 shows an example where indicating measures of the indicating circuit are formed by LEDs.

In FIG. 6, reference numeral 12 designates an indicating panel provided at a position, such as the back side of the stand B (FIG. 1), of being easily visible, although an operator is not hindered in ordinary use of the surgical microscope, and on the panel 12 are arranged LEDs 13 to $21_S$ and 200. In other words, the LEDs 13, 14, 15 are used for the indication of failure areas of the electric magnification device, the LEDs 16, 17, 18 for the indication of failure areas of the electric focusing device, the LEDs 19, $20_M$, $20_S$, $21_M$, $21_S$ for the indication of failure areas of the illumination device, and the LED 200 for the indication that the results of an initial examination are normal. In such a case, the panel is such that the LED 13 (16) goes on when the resultant output of examination delivered from the self-examining circuit 5 for the electric magnification (or focusing) device is represented by the symbol I (FIG. 4), the LED 14 (17) lights up when it is any of C, D, E or G, the LED 15 (18) is on in F or H, and none of the LEDs light in A and B. The panel is also such that the LED 19 lights up when the resultant output of examination delivered from the self-examining circuit 10 for the illumination device is represented by the symbol e (FIG. 5), the LED $20_M$ goes on in d, the LED $21_M$ is on in b or c, and none of the LEDs light in a.

The above description has been made as to the formation for an ordinary self examination after the turning on of the power source, namely, for an ordinary examination, and the present invention allows also the initial examination for self-examining only the illumination device, prior to the ordinary examination, when the power source is switched on, for example. Thus, a circuit configuration of the illumination device including a failure detecting for conducting the initial and ordinary examination of the illumination device will be described in the following.

Figure 7:
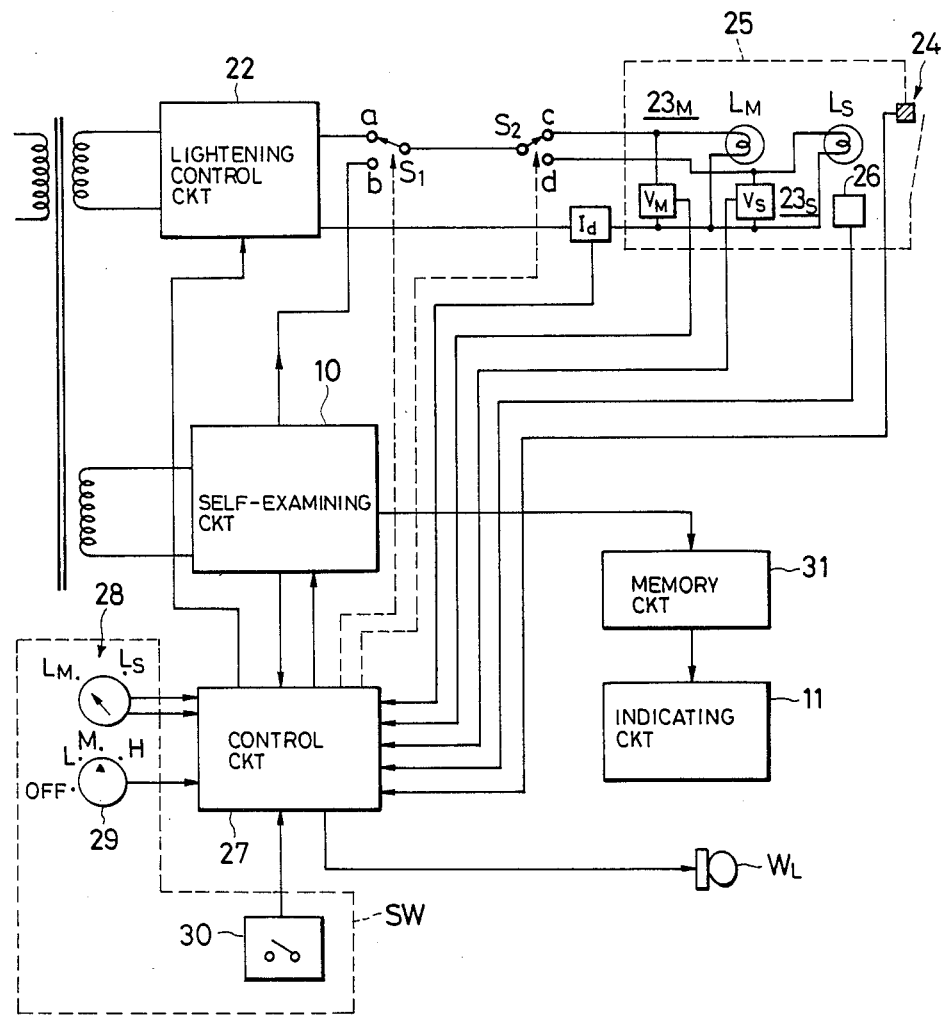
FIG. 7 is a circuit diagram showing an example of the illumination device including the failure detecting device.

FIG. 7 shows a circuit diagram of the illumination device, as an example, and in this figure, reference numeral 22 designates a lightening control circuit capable of applying power source voltage to the illuminating lamp, in which the power source voltage monitoring circuit 7 shown in FIG. 3 is incorporated to monitor the voltage applied to lightening circuits $23_M$, $23_S$. Reference symbol $L_M$ designates a main lamp selected to light for illumination, $L_S$ a spare lamp, and $V_M$ and $V_S$ voltage detectors connected between the terminals of the main lamp $L_M$ and the spare lamp $L_S$, respectively, which are connected with a control circuit 27 to configure the circuit 8 for monitoring voltage to be supplied to illuminating lamp, shown in FIG. 3. Further, reference symbol $I_d$ designates a current detector arranged in a common one, of the terminal lines, of the main lamp $L_M$ and the spare lamp $L_S$ connected to the lightening control circuit 22, which is also connected with the control circuit 27 to configure the circuit 9 for monitoring current to be supplied to illuminating lamp, shown in FIG. 3. Also, reference numeral 24 designates a cover opening and closing sensor for a lamp house 25 incorporating the main lamp $L_M$ and the spare lamp $L_S$, which is constructed so that the microscope apparatus can be operated only when it has been confirmed that the cover is continuously closed in excess of a predetermined time in order to prevent malfunction caused by, for example, the chattering of the sensor. Reference numeral 26 designates a thermosensor for detecting a temperature in the lamp house 25 and numeral 27 designates a control circuit connected to the thermosensor 26, which configure a temperature monitoring circuit for superheat prevention causing an alarm lamp $W_L$ to blink and warning a user when the temperature in the lamp house 25 exceeds a preset temperature value. Further, reference symbol $S_1$ designates a changeover switch for being connected with either of a terminal a of the lightening control circuit or a terminal b of the self-examining circuit 10, and when the switch is connected to the terminal a, rated voltage and current for lightening the lamp are supplied to the main lamp $L_M$, whereas when it is connected to the terminal b, a minimum current for the initial examination is supplied to each of the lamps $L_M$, $L_S$. The amount of current for the initial examination is set at a minimum in order that the lamp is not lightened on the initial examination and that the lamp need not to be necessary to be turned on before the use of the microscope. Also, reference symbol $S_2$ designates a changeover switch for being selectively connected with either of a terminal c of the main lamp $L_M$ or a terminal d of the spare lamp $L_S$. Reference numeral 27 designates the control circuit, already described, controlling the changeover of the changeover switches $S_1$, $S_2$, connected with the lightening control circuit 22 to control the conduction and interruption of the power source voltage, and connected with the voltage detectors $V_M$, $V_S$, reference symbol $S_W$ a remote control switch constructed as, for example, a foot switch, operating the main lamp $L_M$ and the spare lamp $L_S$ through the control circuit 27, reference numeral 28 a selective switch for selecting the lamps conducted for the turning on and the initial examination, 29 a light adjusting switch for adjusting light, including an OFF condition of the lamp (namely, the main lamp $L_M$ in this case) selected by the selective switch 28, and 30 a power source switch for ON/OFF changeover of the main lamp $L_M$ selected. The switches 28, 29 and 30 are included in the remote control switch SW. Also, the self-examining circuit 10 is adapted to examine the normal and abnormal states of the outputs of the power source voltage monitoring circuit 7, the circuit 8 for monitoring voltage to be supplied to illumination lamp and circuit 9 for monitoring current to be supplied to illuminating lamp which are inputted from the control circuit 27, as shown in a logic operation table of FIG. 5, for example, and reference numeral 31 designates a memory circuit storing the results of the preceding examination, in which the power source is turned off or the cover of the lamp house 25 is opened, thereby causing the memory to be reset. Further, the results of the examination of the self-examining circuit 10 are indicated on the indicating panel 12 through the indicating circuit 11.

Figure 8:
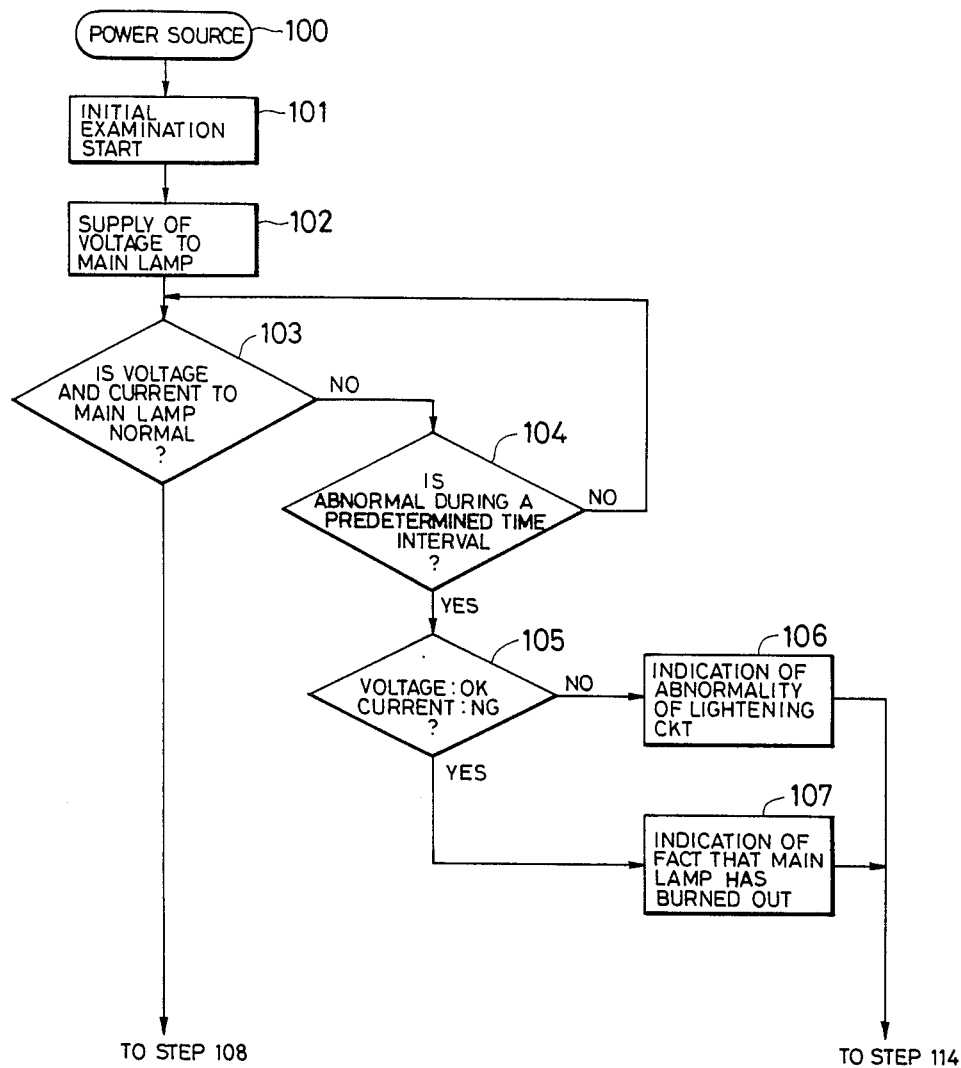
FIGS. 8 to 10 are flow charts of an initial examination with the failure detecting device in the illumination device.
Figure 9:
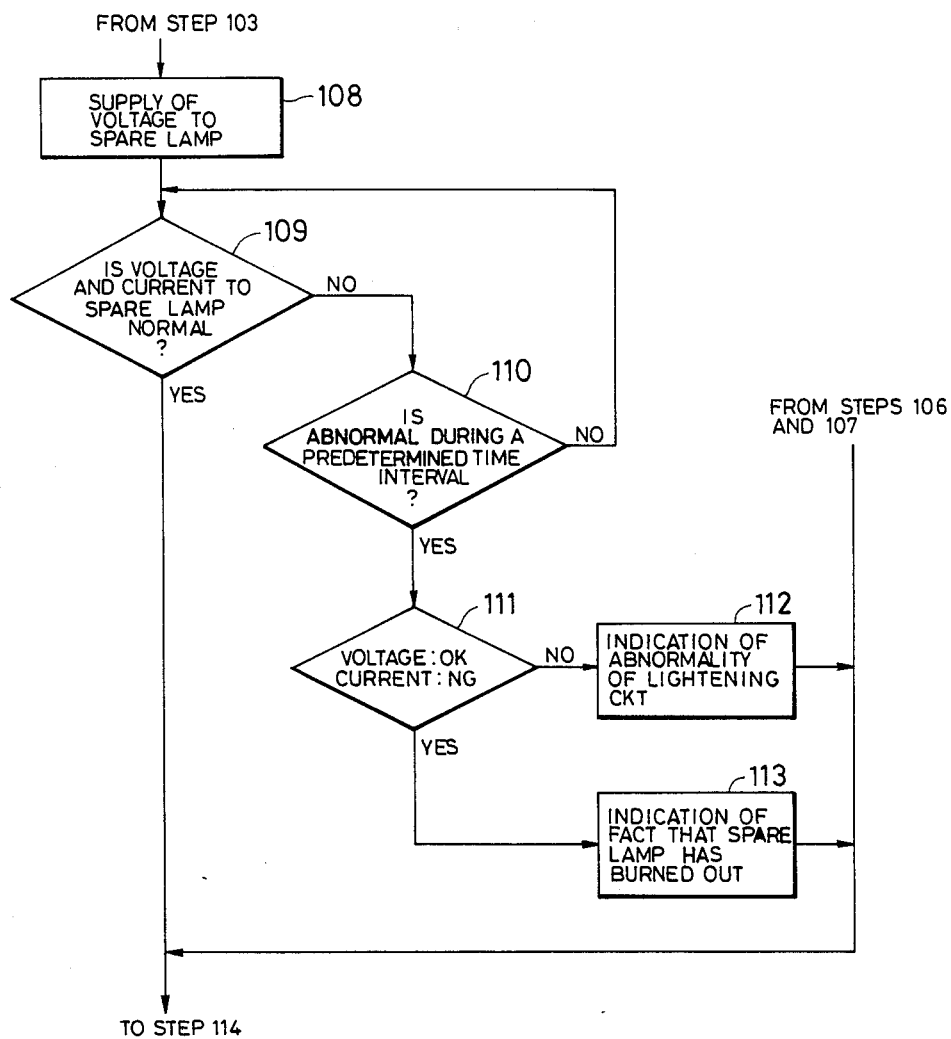
Figure 10:
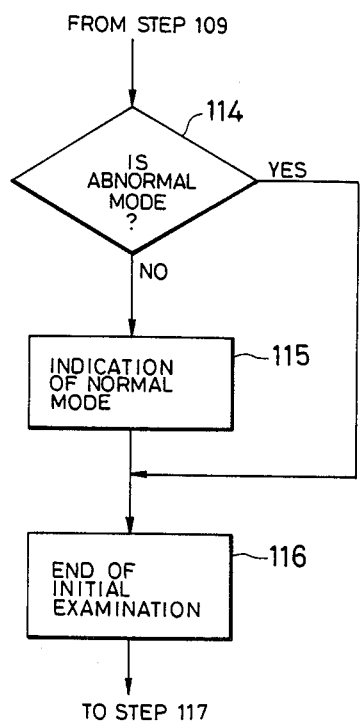
Figure 11:
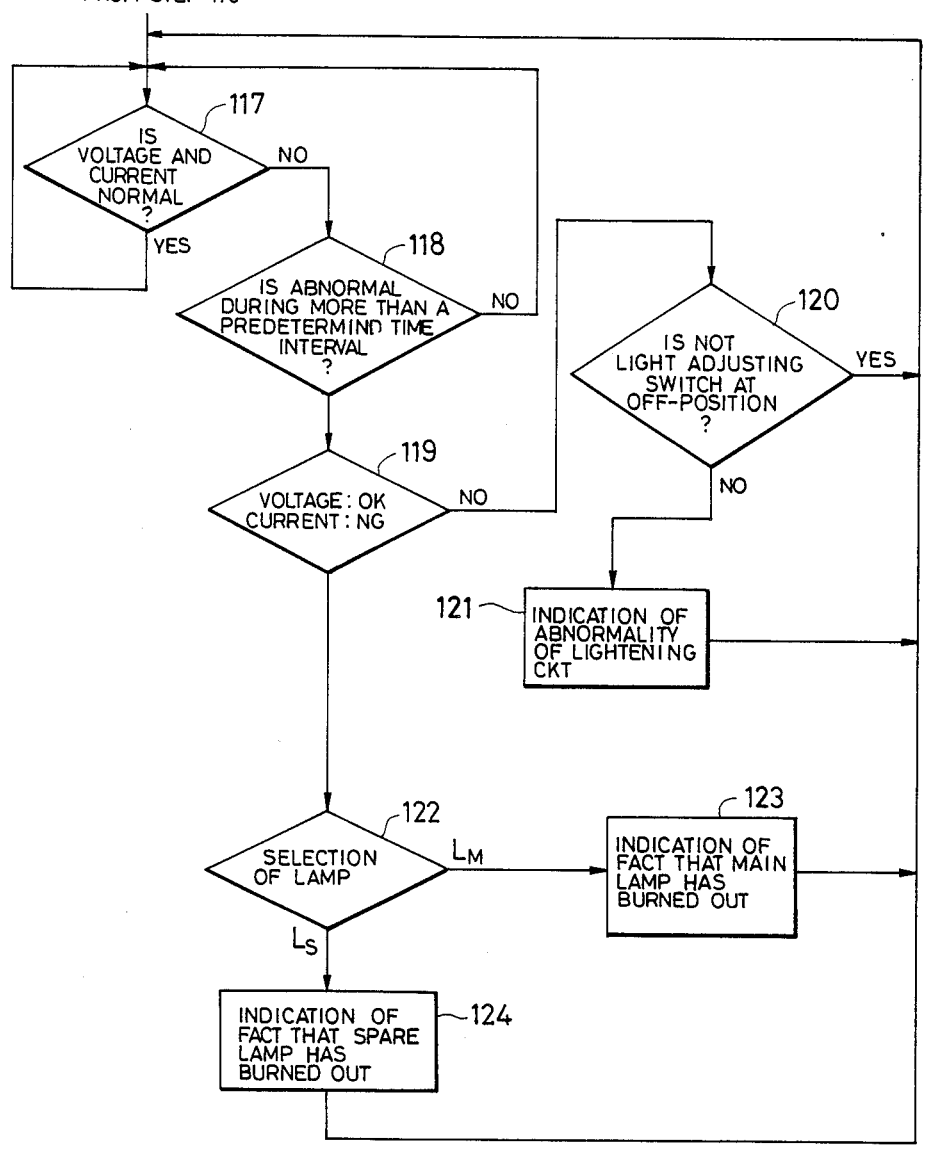
FIG. 11 is a flow chart of an ordinary examination with the failure detecting device in the illumination device.

Next, an explanation will be made as to the functions of the above embodiments. First, referring to FIGS. 8 to 13, the examination of the illumination device will be explained. In FIG. 8, when the power source is turned to the ON state at a step 100, the initial examination is started automatically by the control circuit 27 (at a step 101). Prior to this operation, the changeover switch $S_1$ is connected to the terminal b and the changeover switch $S_2$ to the terminal c provided on the side of the main lamp $L_M$, by means of the control circuit 27 by operating the selective switch 28. Thus, the minimum amount of current flows from the self-examining circuit 10 to the main lamp $L_M$, the voltage and current are detected by the voltage detector $V_M$ and the current detector $I_d$, respectively, and outputted to the control circuit 27 as pulse signals, and the normal or abnormal state of each output is examined by a signal for detector which is delivered from the self-examining circuit 10 to the control circuit 27, in accordance with the pulse signal for judgment which is inputted to the self-examining circuit 10 (at a step 103). Even though the voltage or current supplied to the main lamp $L_M$ is abnormal, it is not regarded as the abnormal state in the case where the abnormal state is so temporary that it does not reach a predetermined time interval and as such the step is returned to the step 103 (at a step 104). Then, if it is judged that the voltage supplied to illuminating lamp is abnormal, the lightening circuit $23_M$ is determined as the abnormal state at a step 106, independently of the normality or abnormality of the lamp current, and the LED $20_M$ of the indicating panel 12 is switched on. Also, if only the lamp current is abnormal, it is judged at a step 107 that the main lamp $L_M$ has burned out, and the LED $21_M$ of the indicating panel 12 is lighted to complete the initial examination of the lamp $L_M$ at a step 116.

Next, the changeover switch $S_2$ is set to the terminal d and then the minimum current is flowed, to carry out the initial examination of the spare lamp $L_S$ at a step 108. Then, as in the initial examination of the main lamp $L_M$, whether or not the voltage or current supplied to the spare lamp $L_S$ is normal is judged and, if it is abnormal, after whether the abnormality is temporary is determined at a step 110, the lightening circuit $23_S$ is judged as the abnormal state (at a step 112) where the voltage supplied to illuminating lamp is abnormal, to light the 5 LED $20_S$ of the indicating panel 12, while on the other hand, if only the lamp current is abnormal, it is judged at a step 113 that the spare lamp $L_S$ has burned out, and then the LED $21_S$ of the indicating panel 12 is lighted to complete the initial examination of the spare lamp $L_S$ at the step 116. If, at a step 109, the spare lamp $L_S$ is also judged as the normal state, the LED 200 of the indicating panel 12 is switched on and the initial examination is completed (at the step 116).

Figure 12:
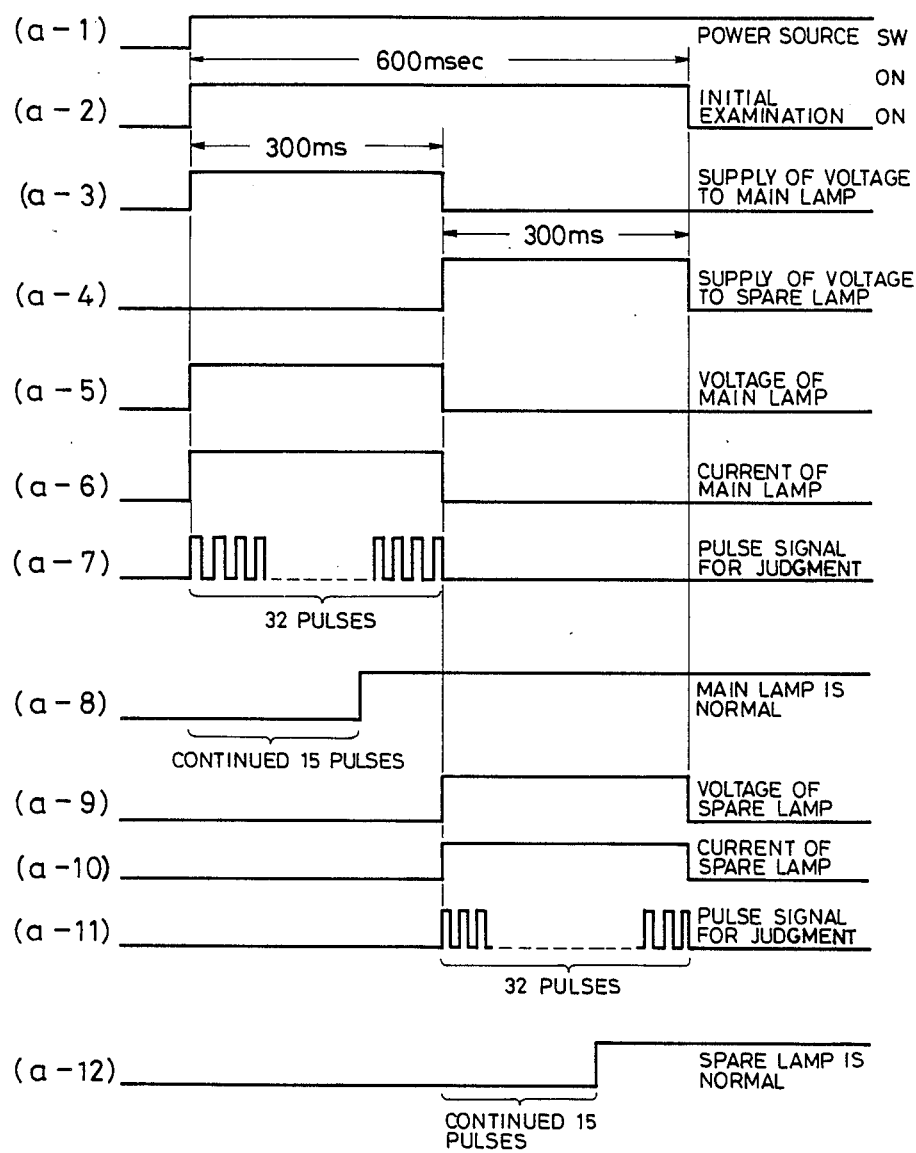
FIG. 12 is a time chart of the initial examination with the failure detecting device in the illumination device.

Here, referring to FIG. 12, a time chart of the initial examination will be explained. The initial examination is started (a-2) interlocking with ON operation of the power source (a-1), the voltage and current to be supplied are set to, for example, about 5V and 5mA, respectively, and the voltage of about 300mS is supplied to each of the main lamp $L_M$ and the spare lamp $L_S$ (a-3, a-4), in which the pulses of the voltage and current to be supplied to the main lamp $L_M$ are maintained in a High state, if it is normal, during the application of voltage for the initial examination as shown in (a-5) and (a-6), respectively. Then, the pulse signal for judgment to be applied to the self-examining circuit 10 is continually applied, by 32 pulses, at a period of a little less than 10mS (a-7) and, of (a-5) and (a-6), referring to the lamp current (a-6) as an example, it is judged by the self-examining circuit 10 that the lamp current is in the normal state if the High state is continually detected more than 15 times for output (a-8). Also, when the current flowing into the main lamp $L_M$ during the application of the lamp voltage becomes a Low state, the pulse signal for judgment detects this state for output and when the signal is continually outputted more than 15 times, it is determined that the current is abnormal and the main lamp has burned out. Therefore, unless the pulse signal for judgment detects continually the Low state more than 15 times, the abnormality is a passing phenomenon and as such the lamp current is not regarded as the abnormal state. The same may be said of the spare lamp $L_S$ shown in (a-9) and (a-12). Also, the same applies to the ordinary examination except for the initial examination.

Then, where the abnormality is detected in the initial examination, after the portion of failure is repaired, the power source is turned on to conduct again the initial examination. Further, the surgical microscope apparatus is constructed so that the initial examination is carried out at any time, no matter whether the surgical microscope is in use or out of use, not only when the power source is turned to ON, but also when the closure after the opening of the cover of the lamp house 25 is confirmed by the cover opening and closing sensor 24, or when it is detected by the thermosensor 26 that the temperature in the lamp house 25 increases above the preset temperature.

Next, failure detection after the completion of the initial examination, that is, the function of the ordinary examination will be explained.

Figure 13:
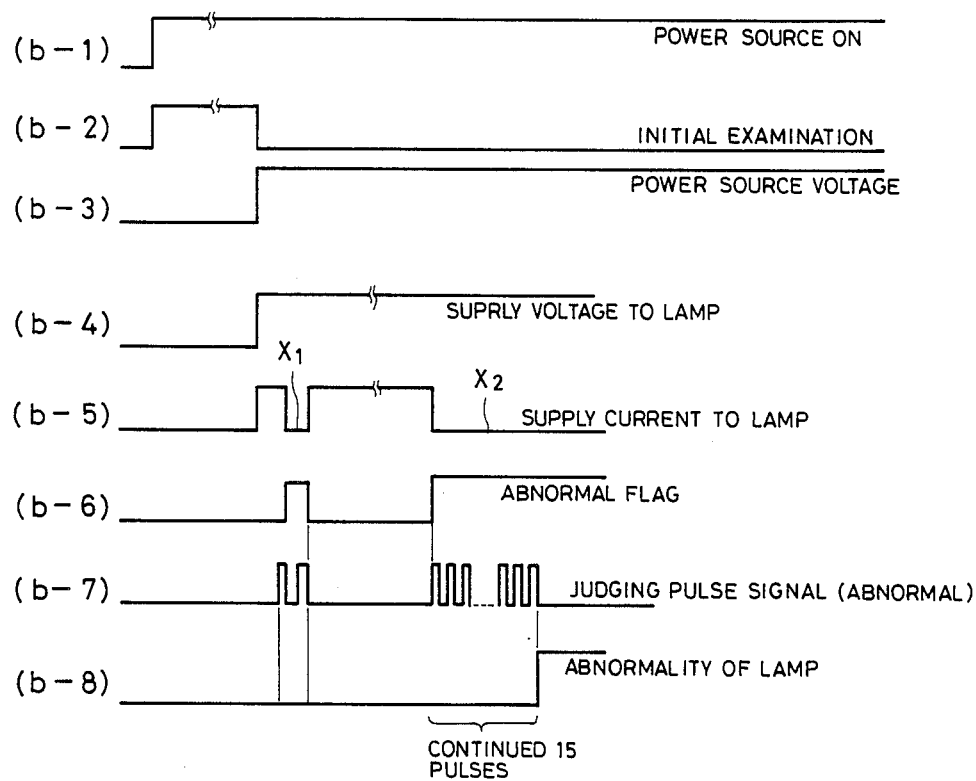
FIG. 13 is a time chart of the ordinary examination with the failure detecting device in the illumination device.

In the ordinary examination of the illumination device, at the moment of the completion of the initial examination, the changeover switch $S_1$ is turned to the terminal a of the lightening control circuit 22 by the control circuit 27 and the changeover switch $S_2$ is turned to the terminal c if the main lamp $L_M$ is to be selected but is turned to the terminal d if the spare lamp $L_S$ is to be selected. Hereinafter, the case wherein the main lamp $L_M$ has been selected and the case wherein the spare lamp $L_S$ has been selected will be explained in turn. Then, the power source voltage applied to the lightening circuit $23_M$ is monitored by the power source voltage monitoring circuit 7 provided in the lightening control circuit 22. Further, in the flow chart shown in FIG. 11, whether the voltage or current supplied to the main lamp $L_M$ is normal is determined at a step 117 and if it is abnormal, whether the abnormal state continues in excess of a predetermined time interval is judged at a step 118, while, if the voltage supplied to illuminating lamp is abnormal, the lightening circuit $23_M$ is judged as the abnormal state except the case where the light adjusting switch 29 is in OFF position (at a step 120) and LED $20_M$ of the indicating panel 12 is switched on to return to the step 117. Also, where only the lamp current is abnormal, it is judged that the main lamp $L_M$ has burned out and then the LED $21_M$ of the indicating panel 12 is lighted (at a step 123). However, where the changeover switch $S_2$ is connected to the terminal d of the spare lamp $L_S$ by the selective switch 28, the LEDs $20_S$ and $21_S$ of the indicating panel 12 are turned on (at steps 121, 124) with the same procedure as in the self-examination of the main lamp $L_M$. Further, when the voltage and current supplied to illuminating lamp are normal at the step 117, the ordinary examination is prosecuted as it is. FIG. 13 shows the time chart of the ordinary examination similar to FIG. 12 and after the completion of the initial examination (b-2), the voltage for lightening the lamp is applied (b-3). Here, even though the current pulse (b-5) flowing through the lamp exhibits temporarily the Low state at $x_1$ and abnormal flag is detected (b-6), the self-examining circuit 10 fails to detect the abnormal state unless the pulse signal for judgment (b-7) is continually outputted more than 15 times. However, when the pulse of current supplied to the lamp (b-5) maintains the Low state at $x_2$ for a long time, the pulse signal for judgment (b-7) is continually outputted more than 15 times to detect the Low state and the self-examining circuit 10 detects the abnormal state, with the result that the lamp has burned out.

Also, the ordinary examination pertaining to the electric magnification device and the electric focusing device is likewise carried out by the failure detecting device shown in FIG. 2.

Accordingly, where the failure is caused in the use of the microscope apparatus, an operator views the indicating panel 12, thereby being able to know immediately a failure area. In other words, if the LED 15 lights as an example, this shows that a driving motor for the electric magnification device has failed.

As mentioned above, according to the embodiments of the present invention, the initial examination of the illumination device is carried out automatically when the power source is conducted, so that the failure of the illumination device can be detected and its defective area can be repaired before the surgical operation. Also after this, in the opening and closing operation of the cover of the lamp house and the increase of temperatures in the lamp house, the initial examination can be performed, and such defects as the failure of a replaced lamp, a mistake in lamp replacement and the failure of the illumination device caused by the temperature increase are detected and repaired each time, with the result that a fatal mistake of the failure of the illumination device in the surgical operation can be avoided in advance. Moreover, even after the initial examination, the defective areas of the illumination device, the electric magnification device and the electric focusing device can subsequently be detected by the ordinary examination. In addition, the defective areas can be distinguished, so that if a user indicates the defective areas to a service man when asking him for repairs, it is only necessary for him to prepare parts required for the repairs, corresponding to the defective areas, and to bring them to the field, and therefore rapid and proper repairs can be made.

Figure 14:
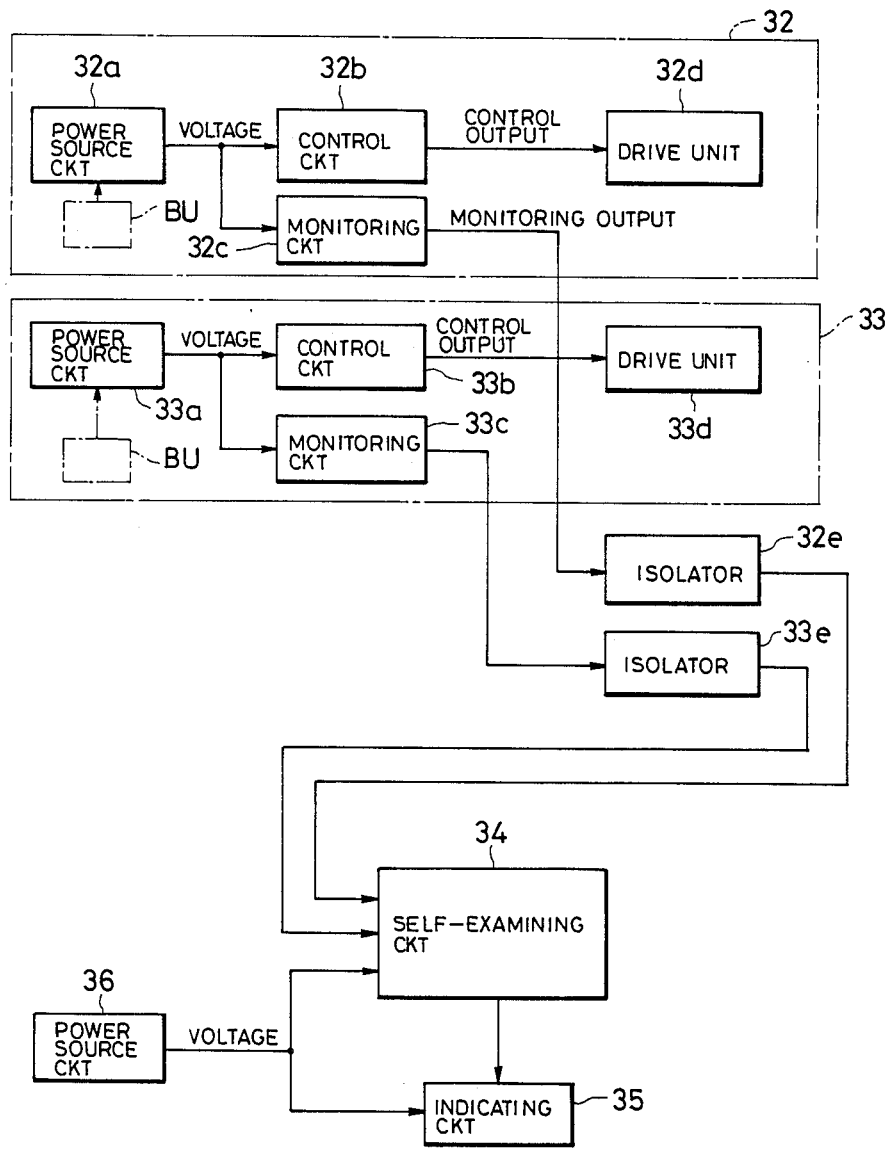
FIG. 14 is a block diagram showing an example of the failure detecting device different from those of FIGS. 2 and 3.

Since, in the embodiments described above, any failure detecting device pertaining to the electric magnification device, the electric focusing device and the illumination device employs a common power source circuit, a problem may be encountered that when some failure detecting device and power source circuit causes the abnormal state and failure, other failure detecting devices also are of no use. This problem, however, can be solved by constructing the failure detecting device as shown in FIG. 14. That is to say, FIG. 14 shows an example provided with two function, for example, the illumination device with the failure detecting device and the electric magnification device with its failure detecting device and using the self-examining circuit in common. In this figure, reference numeral 32 denotes a portion of the illumination device with its failure detecting device as an example, which comprises an independent power source circuit 32a, a control circuit 32b and a monitoring circuit (specifically, various monitoring circuits such as shown in FIG. 3) 32c connected thereto, and a drive unit (specifically, the lamp for illumination) 32d connected to the control circuit 32b. Also, reference numeral 33 denotes, for example, a portion of the electric magnification device with its failure detecting device, which includes an independent power source circuit 32a, a control circuit 32b and a monitoring circuit (specifically, various monitoring circuits such as shown in FIG. 2) 33c connected thereto, and a drive unit (specifically, the driving motor) 33d connected to the control circuit 33b. Monitoring outputs delivered from the monitoring circuits 32c and 33c are electrically insulated through isolators 32e, 33e such as photocouplers, respectively, and are inputted into a self-examining circuit 34. In such a case, the power of the self-examining circuit 34 and an indicating circuit 35 is supplied by an independent power source circuit 36. Although, in this paragraph, the illumination device with its failure detecting device and the electric magnification device with its failure detecting device have been explained as two functions, it is needless to say that the electric focusing device with its failure detecting device can be added to these functions.

By such construction, it is avoided, for example, that the failure of one function prevents the other function, and reliability and safety are further increased. In addition to this, as a result that failure judging function parts have individually independent power sources, even when, for example, both the power source circuits 32a, 33 fail for some cause and the functions of the portions denoted by reference numeral 32 and 33 are stopped, the abnormal state can be detected as long as the power source circuit 36 is normally operated. In this case, if the power source circuit 36 has backup means BU such as batteries as shown in chain lines in FIG. 14, conditions are more favorable.

What is claimed is:

1. A surgical microscope apparatus comprising:
a stereomicroscope for observing an affected part to be operated;
an illumination device attached to said microscope, including a lamp for illumination of the affected part to be operated;
a first failure detecting device, connected to said illumination device, for carrying out an initial examination and an ordinary examination of an operation of said illumination device;
a magnification and focusing device attached to said microscope for electrically controlling a magnifying and focusing of said microscope; and
a second failure detecting device, connected to said magnification and focusing device, for carrying out ordinary examination of operation of said magnification and focusing device.

2. A surgical microscope apparatus according to claim 1, wherein each of said first and second failure detecting devices comprise an operation state monitoring circuit monitoring at least one of a plurality of electrical factor states to be monitored, a self-examining circuit means connected to said operation state monitoring circuit for judging whether said electrical factor state is normal in accordance with an output signal delivered from said operation state monitoring circuit, and an indicating circuit connected to said self-examining circuit for indicating an output delivered from said self-examining circuit means.

3. A surgical microscope apparatus according to claim 2, wherein said operation state monitoring circuit means is electrically insulated from said self-examining circuit.

4. A surgical microscope apparatus according to claim 2, wherein said indicating circuit includes a plurality of indicating lamps which are selectively operated to be indicative of said electrical factor states, wherein said indicating lamps are arranged on a panel.

5. A surgical microscope apparatus according to claim 1, wherein said first failure detecting device comprises a cover opening and closing sensor means for detecting an opening and closing operation of a cover of a lamp house incorporating said lamp for illumination and a thermosensor for detecting whether a temperature in the lamp house is above a preset temperature, and wherein said initial examination is started with a connection of a power source to a light source lamp, detection of cover closure of the lamp house with said cover opening and closing sensor, and detection of the preset temperature in the lamp house with said thermosensor, and wherein said ordinary examination is started after the completion of said initial examination.

6. A surgical microscope apparatus according to claim 5, further comprising warning means connected to said first failure detecting device, wherein when the temperature in said lamp house exceeds the preset temperature, an alarm is raised by said warning means.

7. A surgical microscope apparatus according to claim 1, wherein said magnification and focusing device comprises an electric magnification device and an electric focusing device.

8. A surgical microscope apparatus according to claim 1, wherein said initial examination is conducted by supplying a minimum current to said lamp for illumination.

9. A surgical microscope apparatus comprising:
a stereomicroscope for observing an affected part to be operated;

an illumination device attached to said microscope, including a lamp for illumination of the affected part to be operated;

an electric focusing device and an electric magnification device mounted to said microscope; and a failure detecting device mounted to at least one of said illumination device, said electric focusing device and said electric magnification device, said failure detecting device including an operation state monitoring circuit monitoring operation states of electrical factors to be monitored, an operation state examining circuit judging whether the operation state is normal in accordance with an output signal from said operation state monitoring circuit, and an indicating means indicating an output from said operation state examining circuit.

10. A surgical microscope apparatus according to claim 9, wherein said operation state monitoring circuit is electrically insulated from said operation state examining circuit.

* * * * *